United States Patent
Bauco et al.

(10) Patent No.: US 10,228,526 B2
(45) Date of Patent: Mar. 12, 2019

(54) TRACEABLE CABLE WITH SIDE-EMITTING OPTICAL FIBER AND METHOD OF FORMING THE SAME

(71) Applicant: Corning Optical Communications LLC, Hickory, NC (US)

(72) Inventors: Anthony Sebastian Bauco, Horseheads, NY (US); Douglas Llewellyn Butler, Painted Post, NY (US); Adam Kent Collier, Montour Falls, NY (US); Kevin Alton Lewis, Montour Falls, NY (US); Claudio Mazzali, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/054,380

(22) Filed: Feb. 26, 2016

(65) Prior Publication Data

US 2016/0291277 A1 Oct. 6, 2016

Related U.S. Application Data (63) Continuation of application No. 14/690,752, filed on Apr. 20, 2015.

(Continued)

(51) Int. Cl.
*G02B 6/44* (2006.01)
*F21V 8/00* (2006.01)

(52) U.S. Cl.
CPC .............. *G02B 6/447* (2013.01); *G02B 6/001* (2013.01); *G02B 6/0006* (2013.01); *G02B 6/443* (2013.01)

(58) Field of Classification Search
None
See application file for complete search history.

(56) References Cited

U.S. PATENT DOCUMENTS

| | | | |
|---|---|---|---|
| 3,942,859 A | 3/1976 | Korodi | |
| 4,412,936 A | 11/1983 | Khmelkov et al. | |

(Continued)

FOREIGN PATENT DOCUMENTS

| | | |
|---|---|---|
| CN | 200941319 Y | 8/2007 |
| CN | 201419706 Y | 3/2010 |

(Continued)

OTHER PUBLICATIONS

U.S. Appl. No. 14/295,844, Bookbinder et al., filed Jun. 4, 2014, 25 pages.

(Continued)

*Primary Examiner* — Sung H Pak
(74) *Attorney, Agent, or Firm* — Robert L. Branham (57) ABSTRACT

A traceable cable and method of forming the same. The cable includes at least one data transmission element, a jacket at least partially surrounding the at least one data transmission element, and a side-emitting optical fiber incorporated with and extending along at least a portion of the length of the cable. The side-emitting optical fiber has a core and a cladding substantially surrounding the core to define an exterior surface. The cladding has spaced apart scattering sites penetrating the exterior surface along the length of the optical fiber. The scattering sites scattering light so that the scattered light is emitted from the side-emitting optical fiber at discrete locations. When light is transmitted through the core, light scattered from the side-emitting optical fiber allows the cable to be traced along at least a portion of the length thereof.

26 Claims, 8 Drawing Sheets

Related U.S. Application Data (60) Provisional application No. 62/140,620, filed on Mar. 31, 2015.

(56) References Cited

U.S. PATENT DOCUMENTS

| | | |
|---|---|---|
| 4,466,697 A | 8/1984 | Daniel |
| 4,557,552 A | 12/1985 | Newton et al. |
| 4,637,686 A | 1/1987 | Iwamoto et al. |
| 4,712,858 A | 12/1987 | Presby |
| 4,755,018 A | 7/1988 | Heng et al. |
| 4,763,984 A | 8/1988 | Awai et al. |
| 4,923,274 A | 5/1990 | Dean |
| 4,995,691 A | 2/1991 | Purcell, Jr. |
| 5,006,806 A | 4/1991 | Rippingale et al. |
| 5,017,873 A | 5/1991 | Rippingale et al. |
| 5,040,867 A | 8/1991 | de Jong et al. |
| 5,122,750 A | 6/1992 | Rippingale et al. |
| 5,179,611 A | 1/1993 | Umeda et al. |
| 5,206,065 A | 4/1993 | Rippingale et al. |
| 5,305,405 A | 4/1994 | Emmons et al. |
| 5,329,348 A | 7/1994 | Nimura et al. |
| 5,333,228 A | 7/1994 | Kingstone |
| 5,377,292 A | 12/1994 | Bartling et al. |
| 5,394,496 A | 2/1995 | Caldwell et al. |
| 5,395,362 A | 3/1995 | Sacharoff et al. |
| 5,432,876 A * | 7/1995 | Appeldorn ............ G02B 6/001 362/554 |
| 5,463,706 A | 10/1995 | Dumont et al. |
| 5,500,913 A * | 3/1996 | Allen ................ C03B 37/15 219/121.6 |
| 5,591,160 A | 1/1997 | Reynard |
| 5,666,453 A | 9/1997 | Dannenmann |
| 5,741,152 A | 4/1998 | Boutros |
| 5,764,043 A | 6/1998 | Czosnowski et al. |
| 5,835,654 A | 11/1998 | Bergmann |
| 5,979,188 A | 11/1999 | Ojha |
| 5,982,967 A | 11/1999 | Mathis et al. |
| 6,126,325 A | 10/2000 | Yamane et al. |
| 6,137,928 A | 10/2000 | Albrecht |
| 6,137,935 A | 10/2000 | Bohme et al. |
| 6,173,097 B1 | 1/2001 | Throckmorton et al. |
| 6,257,750 B1 | 7/2001 | Strasser et al. |
| 6,293,081 B1 | 9/2001 | Grulick et al. |
| 6,301,418 B1 * | 10/2001 | Freier ................... G02B 6/001 362/558 |
| 6,311,000 B1 | 10/2001 | Schneider |
| 6,314,713 B1 | 11/2001 | Fitz et al. |
| 6,317,553 B1 | 11/2001 | Harper, Jr. et al. |
| 6,347,172 B1 | 2/2002 | Keller et al. |
| 6,356,690 B1 | 3/2002 | McAlpine et al. |
| 6,379,054 B2 | 4/2002 | Throckmorton et al. |
| 6,388,194 B1 | 5/2002 | Ryeczek |
| 6,403,947 B1 | 6/2002 | Hoyt et al. |
| 6,425,694 B1 | 7/2002 | Szilagyi et al. |
| 6,439,780 B1 | 8/2002 | Mudd et al. |
| 6,456,768 B1 | 9/2002 | Boncek et al. |
| 6,456,785 B1 | 9/2002 | Evans |
| 6,471,412 B1 | 10/2002 | Belenkiy et al. |
| 6,519,396 B2 | 2/2003 | Schneider et al. |
| 6,526,200 B1 | 2/2003 | Davie |
| 6,532,328 B1 | 3/2003 | Kline |
| 6,554,485 B1 | 4/2003 | Beatty et al. |
| 6,560,390 B2 | 5/2003 | Grulick et al. |
| 6,577,243 B1 | 6/2003 | Dannenmann et al. |
| 6,596,943 B1 | 7/2003 | Ward |
| 6,606,431 B2 | 8/2003 | Unsworth |
| 6,678,449 B2 | 1/2004 | Thompson et al. |
| 6,695,491 B1 | 2/2004 | Leeman et al. |
| 6,704,479 B2 | 3/2004 | Koplow |
| 6,710,254 B2 | 3/2004 | Yueh |
| 6,712,524 B2 | 3/2004 | Beatty et al. |
| 6,728,453 B2 | 4/2004 | Petryszak |
| 6,798,956 B2 | 9/2004 | Morrison |
| 6,816,661 B1 | 11/2004 | Barnes et al. |
| 6,823,120 B2 | 11/2004 | Hurley et al. |
| 6,906,505 B2 | 6/2005 | Brunet et al. |
| 6,933,438 B1 | 8/2005 | Watts et al. |
| 6,969,273 B2 | 11/2005 | Chen |
| 6,979,223 B2 | 12/2005 | Chen |
| 7,020,369 B2 | 3/2006 | Lodge, Jr. et al. |
| 7,029,137 B2 | 4/2006 | Lionetti et al. |
| 7,038,135 B1 | 5/2006 | Chan et al. |
| 7,049,937 B1 | 5/2006 | Zweig et al. |
| 7,090,411 B2 | 8/2006 | Brown |
| 7,121,707 B2 | 10/2006 | Currie et al. |
| 7,164,819 B2 | 1/2007 | Jenson et al. |
| 7,217,152 B1 | 5/2007 | Xin et al. |
| 7,221,284 B2 | 5/2007 | Scherer et al. |
| 7,242,831 B2 | 7/2007 | Fee |
| 7,313,304 B2 | 12/2007 | Andrews et al. |
| 7,401,961 B2 | 7/2008 | Longatti et al. |
| 7,406,231 B1 | 7/2008 | Beck et al. |
| 7,433,565 B2 | 10/2008 | Joseph et al. |
| 7,524,082 B2 | 4/2009 | North |
| 7,544,909 B2 | 6/2009 | Dhir |
| 7,572,066 B2 | 8/2009 | De Jong et al. |
| 7,596,293 B2 | 9/2009 | Isenhour et al. |
| 7,603,020 B1 | 10/2009 | Wakileh et al. |
| 7,618,175 B1 | 11/2009 | Hulse |
| 7,620,279 B2 | 11/2009 | Joseph |
| 7,653,277 B2 | 1/2010 | Andrews et al. |
| 7,671,279 B2 | 3/2010 | Yin |
| 7,748,860 B2 | 7/2010 | Brunet |
| 7,817,884 B2 | 10/2010 | Demeritt et al. |
| 7,920,764 B2 | 4/2011 | Kewitsch |
| 7,932,805 B2 | 4/2011 | Darr et al. |
| 7,948,226 B2 | 5/2011 | Rathbun, II et al. |
| 8,000,576 B2 | 8/2011 | Chen et al. |
| 8,102,169 B2 | 1/2012 | Law et al. |
| 8,150,227 B2 | 4/2012 | Kewitsch |
| 8,152,385 B2 | 4/2012 | De Jong et al. |
| 8,167,471 B1 | 5/2012 | Moritz |
| 8,314,603 B2 | 11/2012 | Russell |
| 8,322,871 B1 | 12/2012 | Knaggs et al. |
| 8,331,752 B2 | 12/2012 | Biribuze et al. |
| 8,408,029 B2 | 4/2013 | De Angelis et al. |
| 8,414,319 B2 | 4/2013 | Patel et al. |
| 8,428,405 B2 | 4/2013 | Kewitsch |
| 8,492,448 B2 | 7/2013 | Dewa et al. |
| 8,509,579 B2 | 8/2013 | Martin-Lopez |
| 8,545,076 B2 | 10/2013 | Bickham et al. |
| 8,548,293 B2 | 10/2013 | Kachmar |
| 8,582,939 B2 | 11/2013 | Gimblet et al. |
| 8,582,940 B2 | 11/2013 | Abernathy et al. |
| 8,591,087 B2 | 11/2013 | Bickham et al. |
| 8,620,123 B2 | 12/2013 | Dean, Jr. et al. |
| 8,620,125 B2 | 12/2013 | Button et al. |
| 8,683,827 B2 | 4/2014 | De Angelis et al. |
| 8,708,724 B2 | 4/2014 | Patel et al. |
| 8,724,842 B2 | 5/2014 | Sumitani et al. |
| 8,724,942 B2 | 5/2014 | Logunov et al. |
| 8,770,525 B2 | 7/2014 | Donaldson et al. |
| 8,787,717 B2 | 7/2014 | Logunov |
| 8,791,829 B2 | 7/2014 | Gustafsson et al. |
| 8,798,419 B2 | 8/2014 | Wessels, Jr. et al. |
| 8,805,141 B2 | 8/2014 | Fewkes et al. |
| 8,896,286 B2 | 11/2014 | Abuelsaad et al. |
| 8,896,287 B2 | 11/2014 | Abuelsaad et al. |
| 8,897,612 B2 | 11/2014 | Logunov |
| 8,903,212 B2 | 12/2014 | Kachmar |
| 8,909,013 B1 | 12/2014 | Jiang et al. |
| 8,929,703 B2 | 1/2015 | Logunov et al. |
| 9,025,923 B2 | 5/2015 | Logunov et al. |
| 9,073,243 B2 | 7/2015 | Gimblet et al. |
| 9,146,347 B2 | 9/2015 | Logunov et al. |
| 9,182,561 B2 | 11/2015 | Bauco et al. |
| 9,196,975 B2 | 11/2015 | Scherer et al. |
| 9,271,709 B2 | 3/2016 | Grey et al. |
| 9,304,278 B1 | 4/2016 | Bauco et al. |
| 9,388,975 B2 | 7/2016 | Wenger |
| 9,429,731 B2 | 8/2016 | Bookbinder et al. |
| 9,435,713 B2 | 9/2016 | Collier et al. |
| 9,448,380 B2 | 9/2016 | Mogensen |

(56) References Cited

U.S. PATENT DOCUMENTS

| | | |
|---|---|---|
| 9,507,096 B2 | 11/2016 | Isenhour et al. |
| 9,529,167 B2 | 12/2016 | Wu |
| 9,541,694 B2 | 1/2017 | Tissot |
| 9,709,750 B1 | 7/2017 | Kuang et al. |
| 2001/0002220 A1 | 5/2001 | Trockmorton et al. |
| 2001/0048797 A1 | 12/2001 | Van Dijk et al. |
| 2002/0009282 A1 | 1/2002 | Grulick et al. |
| 2002/0036775 A1 | 3/2002 | Wolleschensky et al. |
| 2002/0037133 A1 | 3/2002 | Unsworth |
| 2002/0136497 A1 | 9/2002 | McGarry et al. |
| 2002/0159735 A1 | 10/2002 | Edvold et al. |
| 2002/0185299 A1 | 12/2002 | Giebel |
| 2003/0002830 A1 | 1/2003 | Petryszak |
| 2003/0016924 A1 | 1/2003 | Thompson et al. |
| 2003/0108270 A1 | 6/2003 | Brimacombe et al. |
| 2003/0206519 A1 | 11/2003 | Sanders et al. |
| 2003/0222786 A1 | 12/2003 | Dannenmann et al. |
| 2004/0022504 A1 | 2/2004 | Hurley et al. |
| 2004/0052473 A1 | 3/2004 | Seo et al. |
| 2004/0146254 A1 | 7/2004 | Morrison |
| 2004/0160774 A1 | 8/2004 | Lionetti et al. |
| 2004/0179777 A1 | 9/2004 | Buelow, II et al. |
| 2004/0196648 A1 | 10/2004 | Franklin et al. |
| 2005/0052174 A1 | 3/2005 | Angelo et al. |
| 2005/0089284 A1 | 4/2005 | Ma |
| 2005/0212503 A1 | 9/2005 | Deibele |
| 2006/0104578 A1 | 5/2006 | Herbst |
| 2006/0133750 A1 | 6/2006 | Lee |
| 2006/0140562 A1 | 6/2006 | Joseph et al. |
| 2006/0193575 A1 | 8/2006 | Greenwood et al. |
| 2006/0232385 A1 | 10/2006 | Scherer et al. |
| 2006/0285350 A1 | 12/2006 | Wang |
| 2007/0116402 A1 | 5/2007 | Slade et al. |
| 2007/0153508 A1 | 7/2007 | Nall et al. |
| 2007/0217749 A1 | 9/2007 | Jong et al. |
| 2008/0080820 A1 | 4/2008 | Andrews et al. |
| 2008/0087082 A1 | 4/2008 | Andrews et al. |
| 2008/0121171 A1 | 5/2008 | Hulsey |
| 2008/0198618 A1 | 8/2008 | North |
| 2008/0204235 A1 | 8/2008 | Cook |
| 2008/0273844 A1 | 11/2008 | Kewitsch |
| 2009/0027873 A1 | 1/2009 | Tarlton |
| 2009/0297104 A1 | 12/2009 | Kachmar |
| 2009/0299440 A9 | 12/2009 | Slatkine |
| 2010/0021114 A1 | 1/2010 | Chen et al. |
| 2010/0066254 A1 | 3/2010 | Ott et al. |
| 2010/0148747 A1 | 6/2010 | Rathbun, II et al. |
| 2010/0166374 A1 | 7/2010 | Lapp |
| 2010/0274235 A1 | 10/2010 | Mihajlovic et al. |
| 2011/0034068 A1 | 2/2011 | Russell |
| 2011/0085776 A1 | 4/2011 | Biribuze et al. |
| 2011/0103747 A1 | 5/2011 | Chang et al. |
| 2011/0103757 A1 | 5/2011 | Alkemper et al. |
| 2011/0122646 A1 | 5/2011 | Bickham et al. |
| 2011/0150488 A1 | 6/2011 | Kewitsch |
| 2011/0305035 A1 | 12/2011 | Bickham et al. |
| 2012/0019900 A1 | 1/2012 | Kitson et al. |
| 2012/0219259 A1 | 8/2012 | Kewitsch |
| 2012/0275178 A1 | 11/2012 | Logunov |
| 2012/0275180 A1 | 11/2012 | Button et al. |
| 2012/0275745 A1 | 11/2012 | Logunov |
| 2013/0021597 A1 | 1/2013 | Carlson, Jr. et al. |
| 2013/0088888 A1 | 4/2013 | Fewkes et al. |
| 2013/0107565 A1 | 5/2013 | Genier |
| 2013/0156392 A1* | 6/2013 | Logunov ............ G02B 6/0003 385/123 |
| 2013/0201001 A1 | 8/2013 | Ratnakar |
| 2013/0209045 A1* | 8/2013 | Dean, Jr. ............ G02B 6/02033 385/113 |
| 2013/0272014 A1 | 10/2013 | Logunov et al. |
| 2013/0341922 A1 | 12/2013 | Jimenez Buendia |
| 2014/0016904 A1 | 1/2014 | Kachmar |
| 2014/0070639 A1 | 3/2014 | Tamura |
| 2014/0221763 A1 | 8/2014 | Vayser et al. |
| 2014/0227438 A1 | 8/2014 | Dean, Jr. et al. |
| 2014/0270639 A1 | 9/2014 | James, III et al. |
| 2014/0355295 A1 | 12/2014 | Kuchinisky et al. |
| 2014/0363134 A1* | 12/2014 | Bookbinder ......... G02B 6/4401 385/100 |
| 2015/0043875 A1 | 2/2015 | Bookbinder et al. |
| 2015/0049992 A1 | 2/2015 | Bauco |
| 2015/0369986 A1 | 12/2015 | Logunov et al. |
| 2016/0139353 A1 | 5/2016 | Bauco et al. |
| 2016/0202418 A1 | 7/2016 | Fortin et al. |
| 2016/0231521 A1 | 8/2016 | Smith et al. |
| 2016/0313483 A1 | 10/2016 | Chomycz |
| 2016/0313513 A1 | 10/2016 | Wijbrans et al. |
| 2016/0377818 A1 | 12/2016 | Tong et al. |
| 2017/0207585 A1 | 7/2017 | Butler et al. |
| 2017/0293102 A1 | 10/2017 | Bauco et al. |
| 2018/0128996 A1 | 5/2018 | Sawicki et al. |

FOREIGN PATENT DOCUMENTS

| | | |
|---|---|---|
| CN | 201429706 Y | 3/2010 |
| CN | 102589728 A | 7/2012 |
| CN | 201305952 U | 7/2012 |
| CN | 202305952 U | 7/2012 |
| CN | 203241575 U | 10/2013 |
| DE | 4413597 A1 | 10/1995 |
| DE | 10239602 B3 | 2/2004 |
| DE | 102007025494 A1 | 12/2008 |
| DE | 102009015263 A1 | 10/2010 |
| DE | 202015007044 U1 | 12/2015 |
| EP | 0874191 A2 | 10/1998 |
| EP | 0952589 A2 | 10/1999 |
| EP | 1168025 A2 | 1/2002 |
| EP | 2113969 A1 | 11/2009 |
| GB | 2260198 A | 4/1993 |
| GB | 2375898 A | 11/2002 |
| JP | 57011305 A | 6/1980 |
| JP | 57-11305 A | 1/1982 |
| JP | 59182404 A | 4/1983 |
| JP | 59-182404 A | 10/1984 |
| JP | 61-139221 A | 6/1986 |
| JP | 61139221 A | 6/1986 |
| JP | 61-161827 U | 10/1986 |
| JP | 61161827 U | 10/1986 |
| JP | 2-55506 A | 2/1990 |
| JP | 1990055506 A | 2/1990 |
| JP | 2-108007 A | 4/1990 |
| JP | 2108007 A | 4/1990 |
| JP | 2108008 A | 4/1990 |
| JP | 02108808 A | 4/1990 |
| JP | 6-017157 U | 3/1994 |
| JP | 6017157 U | 3/1994 |
| JP | 06130253 A | 5/1994 |
| JP | 9-178956 A | 7/1997 |
| JP | 9178956 A | 7/1997 |
| JP | 9-237524 A | 9/1997 |
| JP | 9237524 A | 9/1997 |
| JP | 2008153030 A | 7/2008 |
| JP | 2009244288 A | 10/2009 |
| JP | 2010237233 A | 10/2010 |
| JP | 2013196960 A | 9/2013 |
| KR | 10-0875507 B1 | 12/2008 |
| KR | 875507 B1 | 12/2008 |
| WO | 1998034144 A1 | 8/1998 |
| WO | 1999024856 A1 | 5/1999 |
| WO | 0011484 A1 | 3/2000 |
| WO | 2000011484 A1 | 3/2000 |
| WO | 2005106899 A1 | 11/2005 |
| WO | 2006044177 A2 | 4/2006 |
| WO | 2006113114 A2 | 10/2006 |
| WO | 2007053371 A1 | 5/2007 |
| WO | 2008048955 A2 | 4/2008 |
| WO | 2010011299 A2 | 1/2010 |
| WO | 2010021896 A1 | 2/2010 |
| WO | 2011063214 A1 | 5/2011 |
| WO | 2013055842 A1 | 4/2013 |
| WO | 2013059811 A1 | 4/2013 |
| WO | 2013122825 A1 | 8/2013 |

(56) References Cited

FOREIGN PATENT DOCUMENTS

| WO | 2014026300 A1 | 2/2014 |
|---|---|---|
| WO | 2015000194 A1 | 1/2015 |

OTHER PUBLICATIONS

Side Emitting Super Glowing Fiber, Diode Lasers, Meshtel Lasers Fiber Optics Communications, Jan. 1, 2013, 1 page.
Specifications of our Fiber and Cable, N.p., n.d. Web, Aug. 9, 2013, 2 pages.
Polymer Photonics: An Overview, M. Rajesh, 2011, 38 pages.
Optical fiber with nanostructured cladding of TiO2 nanoparticles self-assembled onto a side polished fiber and its temperature sensing, Lu et al., Optics Express, vol. 22, No. 26, Dec. 29, 2014, 7 pages, downloaded from internet on Jan. 5, 2015.
Schott SpectraStream Glass Harnesses, Rev. 11/06, 2 pages.
Side-Emitting Fibers Brighten Our World in New Ways, Janis Spigulis, Oct. 2005, 6 pages.
Patent Cooperation Treaty International Search Report, Application No. PCT/US2013/025262, Jul. 16, 2013, 7 pages.
Patent Cooperation Treaty International Search Report, Application No. PCT/US2014/049524, Jan. 20, 2015, 5 pages.
Patent Cooperation Treaty International Search Report, Application No. PCT/US2014/049525, Jan. 23, 2015, 18 pages.
Side Emitting Super Glowing Fiber, MeshTel—INTELITE, Inc., 1996-2015, downloaded from Web Jan. 5, 2016, 2 pages.
Super Vision Side Glow Cable, TriNorth Lighting, Inc., 2016, downloaded from Web Jan. 5, 2016, 2 pages.
U.S. Appl. No. 62/193,638, U.S. Appl. No. 62/221,769—Listed in ID as 26113.
U.S. Appl. No. 14/791,924, filed May 20, 2015.
U.S. Appl. No. 15/000,128, filed Jan. 19, 2016.
U.S. Appl. No. 15/054,380, filed Mar. 31, 2015.
U.S. Appl. No. 15/142,853, filed Apr. 29, 2016.
U.S. Appl. No. 62/193,638, filed Jul. 17, 2015.
U.S. Appl. No. 62/193,643, filed Jul. 17, 2015.
U.S. Appl. No. 62/221,769, filed Sep. 22, 2015.
U.S. Appl. No. 62/221,774, filed Sep. 22, 2015.
U.S. Appl. No. 62/248,490, filed Oct. 30, 2015.
International Search Report and Written Opinion PCT/US2016/020542 dated Jun. 7, 2016.
International Search Report and Written Opinion PCT/US2016/031624 dated Aug. 31, 2016.
http://www.dexim.net/list.php?id=7, Dexim product reference, downloaded from the web Feb. 24, 2016. 2 pages.

Kremenakova, et al., "Characterizaion of Side EmmittingPolymeric Optical Fibres," Jounal of Fiber Bioengineering & Informatics 5:4 (2012) pp. 423-431, http://www.jfbi.org, Dec. 2012.
Fiber Optic Products, Inc., "Specifications of our Fiber and Cable," n.d. Retrieved on Aug. 9, 2013, 2 pages.
M. Rajesh, "Polymer Photonics: An Overview," Fabrication and Characterisation, 2011, 38 pages.
Schott, "SpectraStream Glass Harnesses," Rev. Nov. 2006, 2 pages.
Spigulis, J., "Side-Emitting Fibers Brighten Our World in New Ways," Oct. 2005, Retrieved from www.osa-opn.org, 6 pages.
Patent Cooperation Treaty, International Search Report, Application No. PCT/US2013/025262, dated Jul. 16, 2013, 7 pages.
"Super Vision Fiber Optics Side Glow Cables," TriN01ihLighting.com, Tri North Lighting, Inc., n.d., Web. Aug. 1, 2013.
U.S. Appl. No. 13/431,565, filed Mar. 27, 2012, David L. Dean, Jr., 32 pages.
European Search Report, Application No. 15168466.9-1553, dated Dec. 17, 2015, 9 pages.
Patent Cooperation Treaty, International Search Report for PCT/US2015/060558, dated Feb. 9, 2016, 5 pages.
Patent Cooperation Treaty International Search Report, Application No. PCT/US2014/049524, dated Jan. 20, 2015, 5 pages.
"Diode Lasers, Fiber Optics, IR, Red, Green, Blue Diode Lasers, Laser Diode, Fiber Illuminators, Fiber Optics, Coupler, Galvonarneters, Laser Show Acessories," Jan 1, 2013, httn://www.meshtel.com/, 1 oage.
Patent Cooperation Treaty, International Search Report, PCT/US2014/049525, dated Jan. 23, 2015, 18 pages.
U.S. Appl. No. 14/295,844, Bookbinder filed Jun. 4, 2014, 25 pages.
Patent Cooperation Treaty, International Search Report and Written Opinion for International Application No. PCT/US2014/041510, dated Sep. 18, 2014, 10 pages.
International Searching Authority Invitation to Pay Additional Fees PCT/US2016/055497 dated Dec. 19, 2016.
Non-Final Office Action for U.S. Appl. No. 14/690,752, dated Oct. 2, 2015, 12 pages.
International Preliminary Report on Patentability for PCT/US2016/020542, dated Oct. 12, 2017, 8 pages.
International Search Report and Written Opinion PCT/US2016/042414 dated Oct. 5, 2016.
International Searching Authority Invitation to Pay Additional Search Fees PCT/US2016/042416 dated Oct. 7, 2016.
Endruweit et al. "Spectroscopic experiments regarding the efficiency of side emission optical fibres in the UV-A and visible blue spectrum", Optics and Lasers in Engineering 46 (2008) pp. 97-105.

* cited by examiner

TRACEABLE CABLE WITH SIDE-EMITTING OPTICAL FIBER AND METHOD OF FORMING THE SAME

PRIORITY APPLICATION

This application is a continuation of U.S. application Ser. No. 14/690,752 filed on Apr. 20, 2015, which claims the benefit of priority to Provisional Application Ser. No. 62/140,620, filed on Mar. 31, 2015, both applications being relied upon and incorporated herein by reference their entireties.

BACKGROUND

This disclosure generally relates to waveguides that scatter light from the side thereof. More particularly, this disclosure relates to cables and cable assemblies, such as patch cords, that are traceable due to the addition of a side-emitting optical fiber.

Today's computer networks continue to increase in size and complexity. Businesses and individuals rely on these networks to store, transmit, and receive critical data at high speeds. Even with the expansion of wireless technology, wired connections remain critical to the operation of computer networks, including enterprise data centers. Portions of these wired computer networks are regularly subject to removal, replacement, upgrade or other moves and changes. To ensure the continued proper operation of each network, the maze of cables connecting the individual components must be precisely understood and properly connected between specific ports.

In many cases, a network's cables, often called patch cords, can be required to bridge several meters across a data center. The cables may begin in one equipment rack, run through the floor or other conduit, and terminate at a component in a second equipment rack.

As a result, there is a need for a traceable cable that provides a means for the network operator to quickly identify the path and approximate terminal end of a given cable that is being replaced, relocated, or tested.

SUMMARY

The present disclosure includes traceable cables and side-emitting waveguides used in the same. In one embodiment of this disclosure, the cable includes at least one data transmission element, a jacket at least partially surrounding the at least one data transmission element, and a side-emitting optical fiber incorporated with and extending along at least a portion of the length of the cable. The side-emitting optical fiber has a core and a cladding substantially surrounding the core to define an exterior surface. The cladding has spaced apart scattering sites penetrating the exterior surface along the length of the optical fiber. The scattering sites scatter light so that the scattered light is emitted from the side-emitting optical fiber at discrete locations. When light is transmitted through the core, light scattered from the side-emitting optical fiber allows the cable to be traced along at least a portion of the length thereof.

The present disclosure also includes methods of forming traceable cables having at least one data transmission element and a jacket at least partially surrounding the at least one data transmission element. The method may comprise forming a side-emitting optical fiber by: adding a cladding around a glass core to create an exterior surface, the cladding having a lower index of refraction than the glass core, selectively ablating portions of the cladding to create scattering sites penetrating the exterior surface and configured to allow the side-emitting optical fiber to scatter light therefrom, and at least partially embedding the side-emitting optical fiber within the jacket so that the side-emitting optical fiber extends along at least a portion of a length of the cable.

The present disclosure also includes another method of forming a traceable cable that includes at least one data transmission element and a jacket at least partially surrounding the at least one data transmission element. The method may comprise forming an optical fiber by: passing a glass core through a first die block that applies a UV-curable cladding onto the glass core to form an optical fiber, wherein the cladding has a lower index of refraction than the glass core. The optical fiber is further formed by drawing the optical fiber past a laser, wherein the laser is pulsed as the optical fiber is drawn past the laser to selectively ablate portions of the cladding, the laser ablated portions defining scattering sites configured to allow the optical fiber to scatter light therefrom. Forming the optical fiber may further comprise passing the optical fiber through a second die block after selectively ablating portions of the cladding with the laser, wherein the second die block applies an acrylic coating over the cladding. The method may further include at least partially embedding the optical fiber within the jacket so that the optical fiber extends along at least a portion of a length of the cable.

Additional features and advantages will be set forth in the detailed description which follows, and in part will be readily apparent to those skilled in the art. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, the description relates to side-emitting waveguides, cables, and cable assemblies using the waveguides to facilitate the traceability of the cable or cable assembly. This description also relates to methods of forming the side-emitting waveguides, cables and cable assemblies.

Figure 1:
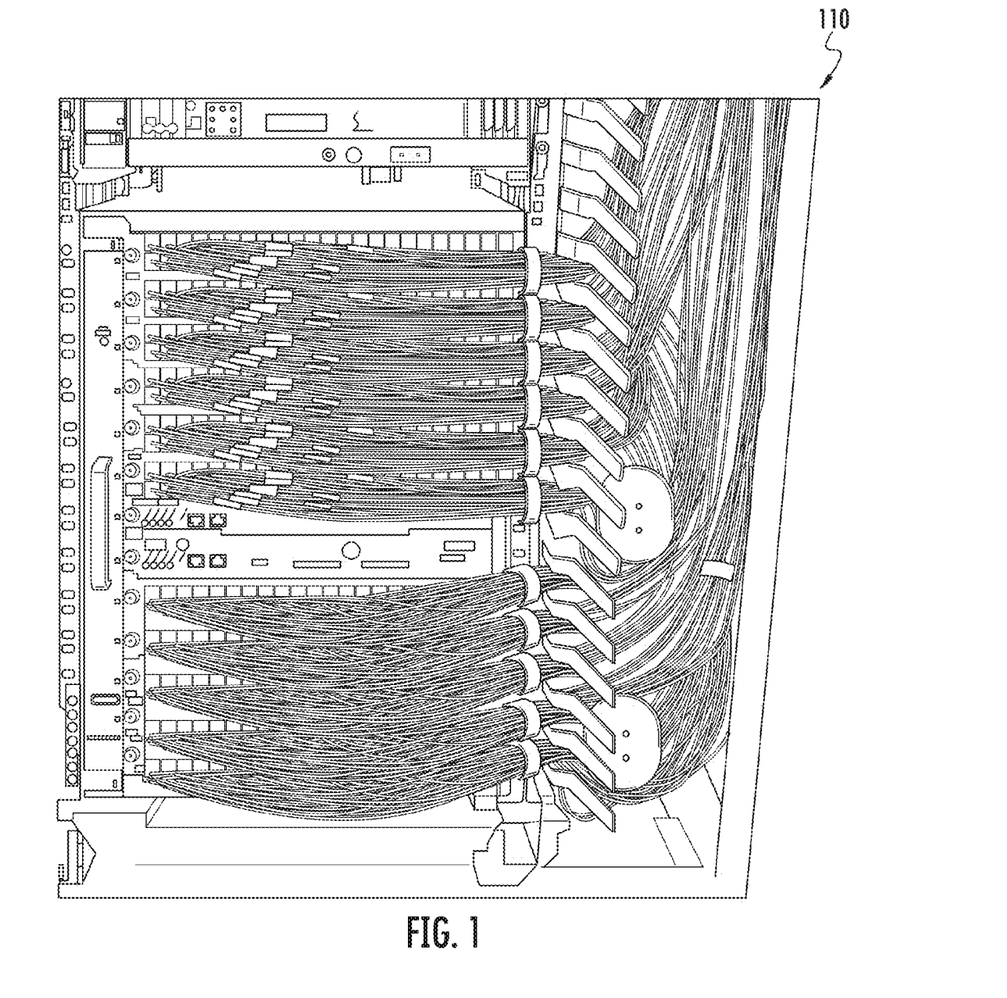
FIG. 1 is a perspective view of an equipment rack supporting patch cords.
Figure 2:
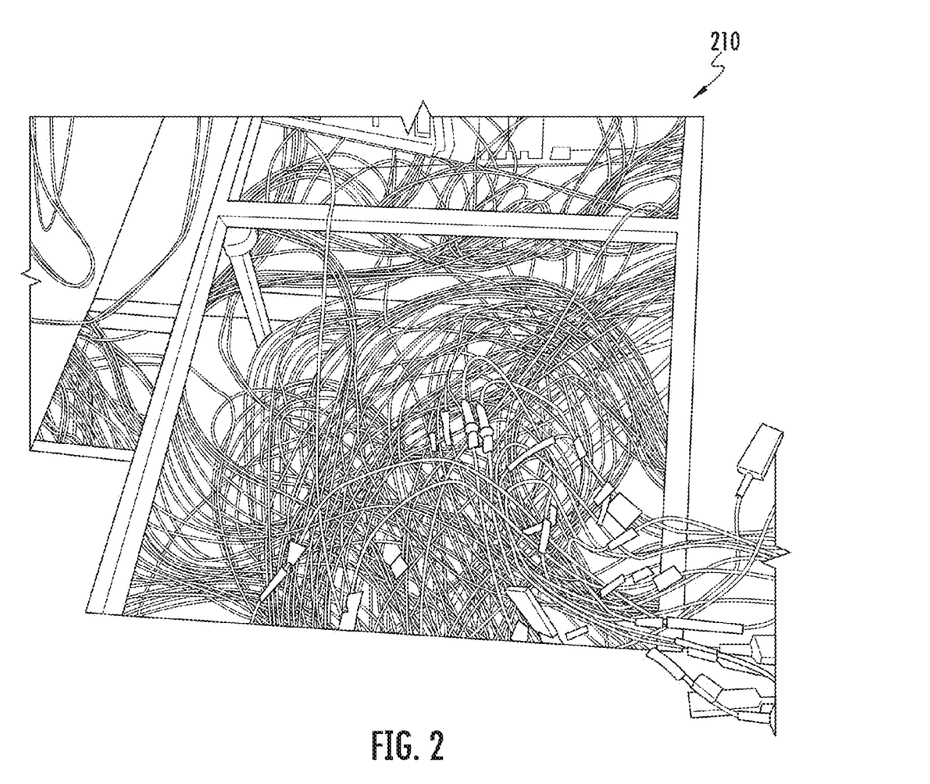
FIG. 2 is a perspective view of an under-floor cable tray supporting patch cords.

A problem that occurs in data centers or similar network locations is congestion and clutter caused by large quantities of cables. FIG. 1 shows an example of congestion in an equipment rack 110. FIG. 2 shows congestion in an underfloor cable tray 210. Network operators frequently desire to change connections to accommodate moves, adds, and changes in the network. However, such congestion makes it difficult to trace a particular cable from the source to the receiver, which may be required to perform the moves, adds, and changes in the network.

An aspect of this disclosure is the provision of side-emitting waveguides, usable within traceable cables, which provide efficient light emission that may provide visibility of the waveguide in well-lit rooms over a significant distance, wherein the waveguides may be produced by an efficient manufacturing method.

Figure 3:
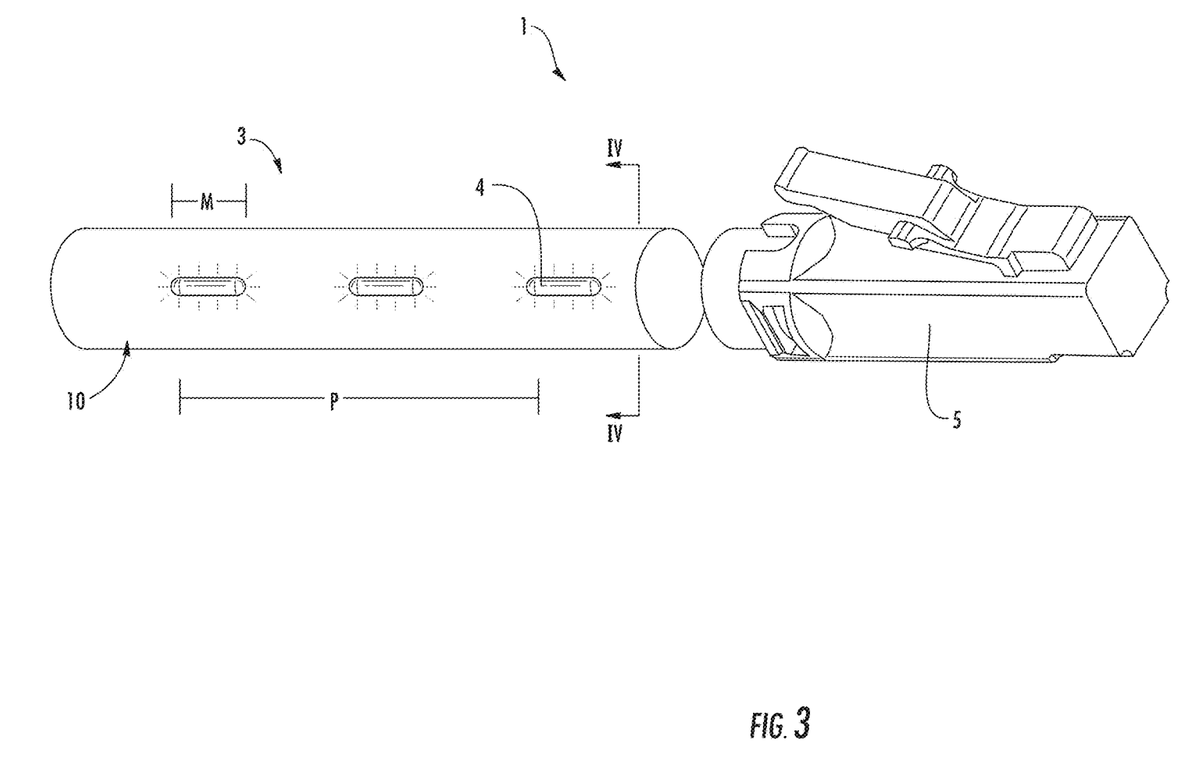
FIG. 3 is a side view, partially in cross-section, of a portion of a traceable cable assembly according to one embodiment.

Turning back to the figures, FIG. 3 shows a cable assembly 1 with improved tracing capabilities according to embodiments of the present disclosure. The cable assembly 1 includes a cable 3, tracer locations 4, and a connector 5. Although not shown, it should be understood that a connector 5 may be present on each opposite end of the cable 3 to allow the cable assembly 1 to act as a patch cord between components of a network. The connector 5 may vary widely depending on the nature of the cable 3 and the components being connected. The specific connector 5 selected should match the port configuration of the network component and will vary based upon the quantity and type of signals being transmitted by the cable 3. The distance between the connectors 5 may define a length for the cable 3. Cables 3 of the present disclosure are not specifically limited in their length, however, the cables 3 may have a length of at least about 1 meter and up to several tens of meters, such as one-hundred meters.

Figure 4:
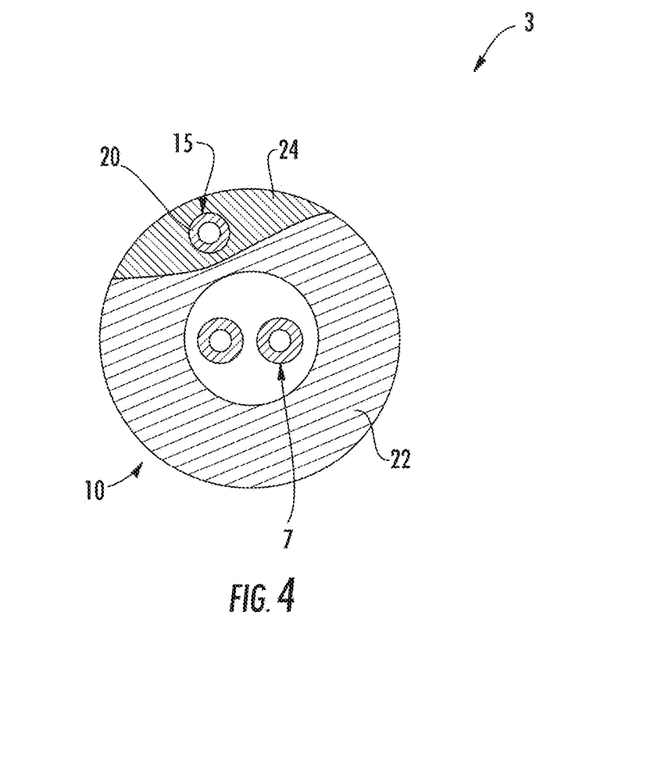
FIG. 4 is a cross-sectional view of the cable assembly of FIG. 3 along the plane IV-IV.

FIG. 4 shows a cross section of the cable 3 to represent one possible embodiment. The cable 3 may include one or more data transmission elements 7. Two such data transmission elements 7 are shown. The data transmission elements 7 may be of the same type or different types as compared to one another. Generally, a data transmission element 7 is a structure capable of carrying a data signal from one end of the cable 3 to the other. The data transmission element 7 may be configured to transmit an electrical signal, for example, using a copper wire or other electrically conductive material. Alternatively, or in addition, the data transmission element 7 may be configured to transmit an optical signal by conducting electromagnetic waves such as ultraviolet, infrared, or visible light to carry data from one location to another.

In some embodiments, the cable 3 may be more appropriately referred to as a conduit, without having any data transmission elements 7. Instead of transmitting a data signal, these cables 3 may transmit fluids such as air or liquid. These cables 3 may be appropriate for use in a medical setting such as IV lines or oxygen tubing. The cable 3 includes a jacket 10. The jacket 10 may be a hollow tube forming a conduit that can substantially surround the data transmission elements 7 and that can define an outer surface of the cable 3. Alternatively, the data transmission elements 7 may be at least partially embedded within the jacket 10.

Cables 3 of the present disclosure include a tracer element 15. The tracer element 15 is provided to enable the cable 3 to be selectively identified at one or more areas along the cable 3. The tracer element 15 may be visually identified with or without special equipment, such as an IR camera.

One example of a tracer element 15 is a side-emitting optical fiber 20 used to identify one or more portions of the cable 3. The side-emitting optical fiber 20 may be referred to interchangeably as a side-emitting optical waveguide herein. Therefore this disclosure does not intend to differentiate between the terms "optical fiber" and "optical waveguide" per se. The side-emitting optical fiber 20 may conduct nonvisible light. The side-emitting optical fiber 20 can also be used to conduct visible light, such as green light at approximately 532 nm. Red light, blue light, or a combination thereof could also be used to assist with tracing the cable 3. Green light may be used due to the relative high degree of sensitivity of the human eye to green light.

As seen in FIG. 4, the side-emitting optical fiber 20 is embedded within a portion of the jacket 10. In alternative embodiments, the side-emitting optical fiber 20 could be adjacent to the data transmission elements 7 inside a cavity formed by the jacket 10. If the side-emitting optical fiber 20 is within such a cavity, the jacket 10 may have at least some areas that are highly transparent. In yet other embodiments, the side-emitting optical fiber 20 could be provided on or mounted to the outside of the jacket 10.

Still referring to FIG. 4, the jacket 10 may include a pigmented portion 22 and an un-pigmented portion 24. The pigment used in the pigmented portion 22 may be selected to identify the nature of the cable 3 to one of ordinary skill in the art, based on the number, type, and arrangement of data transmission elements 7 therein. The side-emitting optical fiber 20 may be embedded within the un-pigmented portion 24. The un-pigmented portion 24 may include some pigment, but is typically more optically transparent than the pigmented portion 22. Therefore by locating the side-emitting optical fiber 20 within the un-pigmented portion 24, any light scattered from the side-emitting optical fiber 20 will be more visible.

Figure 5:
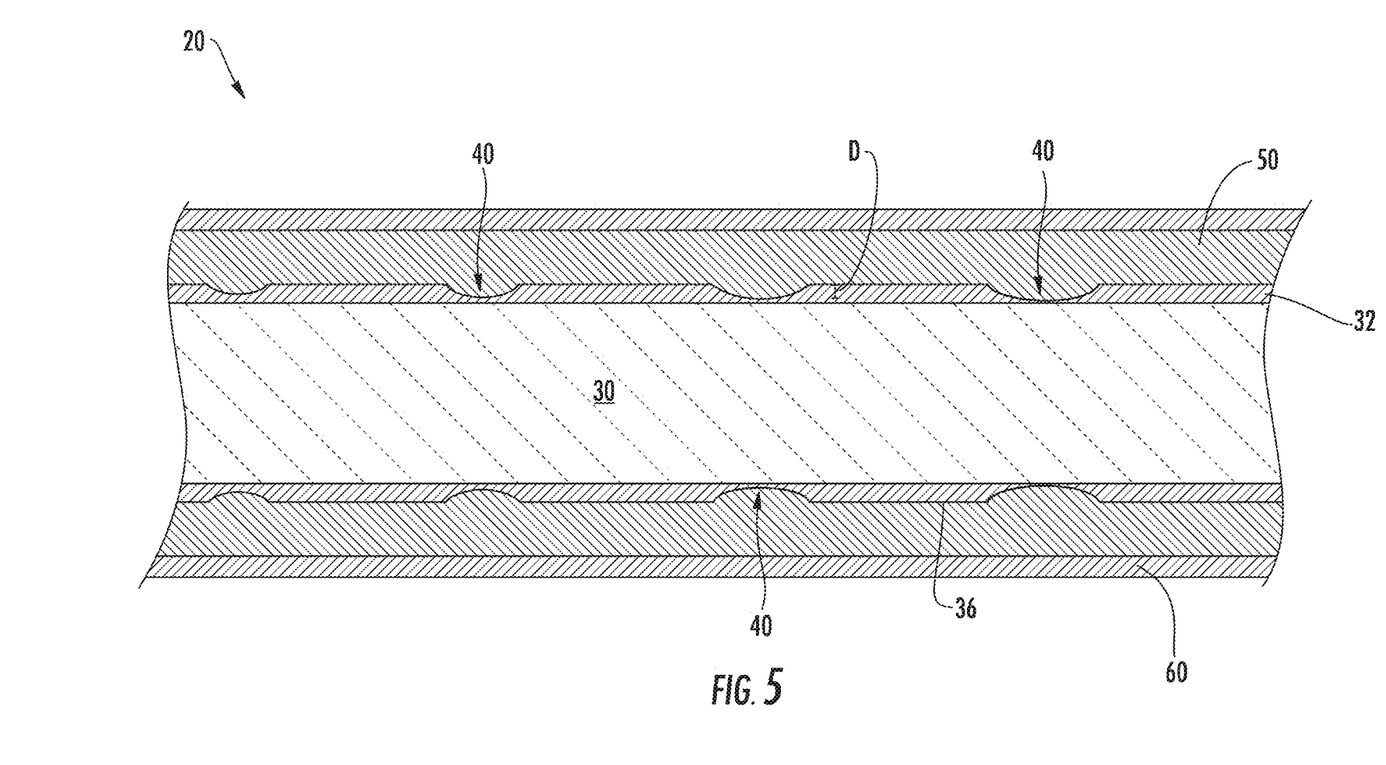
FIG. 5 is a lengthwise cross sectional view of a tracer element of the cable assembly according to embodiments of the present disclosure.

Turning to FIG. 5, the side-emitting optical fiber 20 includes at least a core 30 and a cladding 32. The core 30 may be made from glass, particularly silica-based glass, having a first index of refraction. Alternatively, the core 30 may be formed from a polymer. The size of the core 30 is not particularly limited, but in some embodiments diameters may be between and including about 100 microns and about 250 microns. The core may be, for example, 125 microns. Cores that are significantly smaller may be subject to damage from handling, and cores that are significantly larger may be subject to damage when bending.

In some embodiments, the core 30 may be a substantially solid core, generally free of voids or air pockets as found within the airline optical fiber type of diffusive optical fibers. A core 30 that is free from voids may facilitate splicing, polishing, or other processing operations, which may be needed in some embodiments to make ends of the side-emitting optical fiber 20 compatible with a device for launching light into the side-emitting optical fiber.

The cladding 32 can be a polymer, such as fluoro-acrylate. In the embodiment illustrated in the drawings, the material for the cladding 32 is selected to have an index of refraction that differs from the index of refraction of the core 30. In some embodiments the index of refraction of the cladding 32 is lower than that of the core. In some embodiments, the indices of refraction produce a step-index optical fiber. In other embodiments, the side-emitting optical fiber 20 may be a trapezium or triangular index fiber. The cladding 32 closely surrounds the core 30 to help maintain light within the side-emitting optical fiber 20. The cladding 32 may have a thickness between about 4% and about 40% of the diameter of the core. For example, the cladding 32 may be between about 5 and about 50 microns thick from the surface of the core 30 to an exterior surface 36 of the cladding 32 when the core 30 has a diameter of 125 microns.

According to embodiments of the present description, scattering sites 40 are selectively provided at spaced apart locations on the cladding 32 along the length of the side-emitting optical fiber 20. The scattering sites 40 are configured to provide areas where light, which is otherwise traveling along the side-emitting optical fiber 20, is scattered and therefore able to be emitted from the side of the side-emitting optical fiber 20, as shown in stippled lines in FIG. 6, to form the tracer locations 4 shown in FIG. 3.

The scattering sites 40 are areas where the exterior surface 36 is modified, removed, deformed, or damaged to produce optical surfaces tending to scatter incoming light. Some or all of the scattering sites 40 may be annular or otherwise generally ring shaped, extending around the entire circumference of the side-emitting optical fiber 20. In some embodiments, as understood from FIG. 6, each scattering site 40 does not extend around the full circumference of the side-emitting optical fiber 20. The scattering sites 40 may sweep an arc approximately 180 degrees, 90 degrees, or even less around the circumference.

Figure 6:
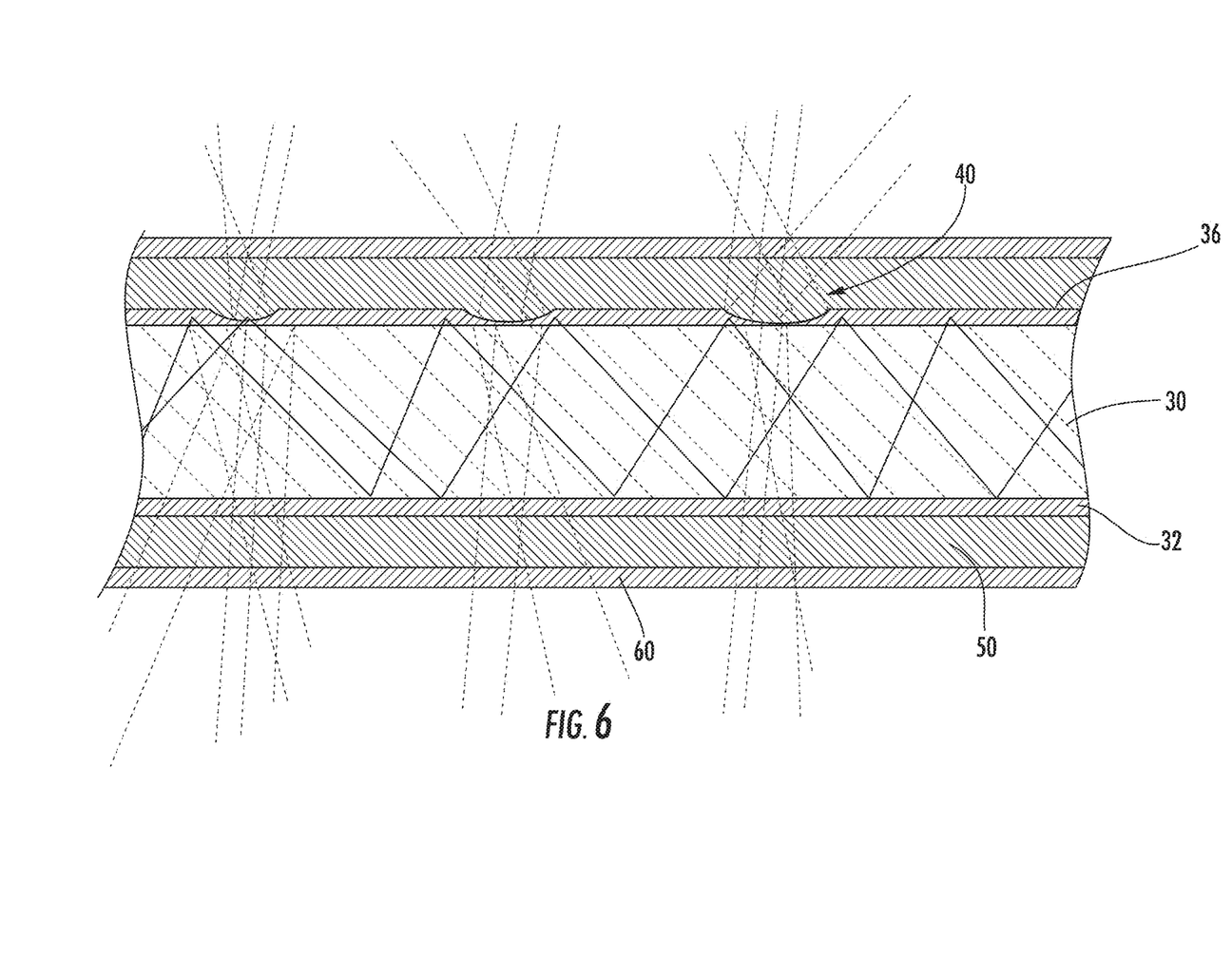
FIG. 6 is a schematic view of light propagating through and being scattered from the tracer element of FIG. 5.

A complete ring shape may provide the most uniformly scattered light, but a full ring is not believed necessary to have light scatter in all 360 degrees around a lengthwise axis of the side-emitting optical fiber 20 and/or light to be seen 360 degrees a lengthwise axis of the cable 3. The scattering sites 40 scatter light generally in all directions with varying intensity. Therefore, each scattering site 40 directs light immediately out of an adjacent portion of the exterior surface 36, and also directs light back through the core 30 and out an opposite portion of the exterior surface 36 as schematically illustrated in FIG. 6. Scattering light from the side-emitting optical fiber 20 about 360 degrees can be desired to avoid directionality in the side-emitting optical fiber 20. Directionality may require more precise orientation of the side-emitting optical fiber 20 with the jacket 10 and cable 3. If the side-emitting optical fiber 20 emitted light in to a particular direction, that emission direction may need to be oriented toward the exterior of the cable 3 to be visible. Again, by scattering light 360 degrees around the side-emitting optical fiber 20, the side-emitting optical fiber allows the scattered light be to be seen from any viewpoint around the lengthwise axis of the cable 3.

Figure 7:
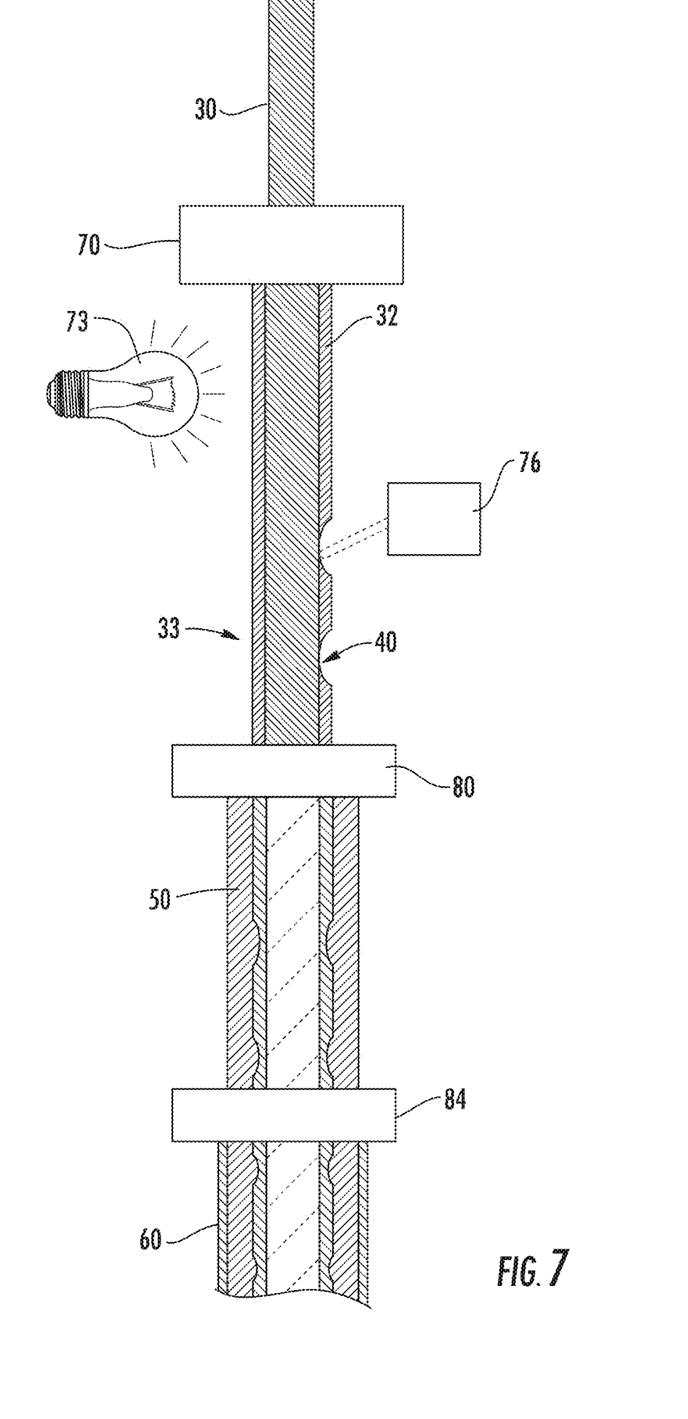
FIG. 7 shows a method of forming a side-emitting optical fiber as the tracer element of FIG. 5.

The scattering sites 40 may be produced by a variety of mechanical, optical, or chemical processes. In the embodiment of FIG. 7, the scattering sites 40 are produced as the result of ablation caused by impact with high intensity light from a laser 76. The ablation process removes some of the cladding 32 and leaves behind an optically rough surface portion.

Several characteristics of the scattering sites 40 may be refined to help ensure that the extraction of light from the core 30 and cladding 32 to provide tracer locations 4 along the cable 3 are each visible in a well-lit environment. The characteristics may also be refined based the practical manufacturability of the cable 3 and side-emitting optical fiber 20.

First, the separation P between the scattering sites 40 may be selected to address the unique challenges associated with cable assemblies for data centers or similar network locations. In one embodiment, the scattering sites 40 should be at least about 1 cm apart and less than about 1 meter apart. Scattering sites 40 that are too close together approach a uniform emission along the length of the cable 3, and may lose the efficient use of light provided by the discrete tracer locations 4. Scattering sites 40 that are too far apart may lose the benefits of along-the-length tracer locations 4 and the ability to sufficiently trace the cable 3 in its environment with other cables. Additionally, scattering sites 40 that are too far apart may result in no scattering sites 40 sufficiently close to the terminal end of the cable 3 to provide a tracer location 4 within the appropriate equipment rack 110. An approximate separation P of about 10 cm may balance the light efficiency and traceability benefits, keeping in mind that several of the tracer locations 4 may be hidden behind other cables, effectively increasing the relative spacing between each tracer location 4. In some embodiments, the separation P may facilitate identifying the overall length of the cable 3. For example, the approximate separation P may be about 1 meter in some embodiments, thereby allowing a person to count the tracer locations 4 to approximate the total length of the cable 3 in meters. In other embodiments, the approximate separation P may be about 1 foot, thereby allowing a person to count the tracer locations 4 to estimate the total length of the cable 3 in feet.

As used herein, the cable 3 and the side-emitting optical fiber 20 may be described as each having respective launched ends and traced ends. The launched ends can be the known, accessible end of the cable 3 and end of the side-emitting optical fiber 20 where the network operator would provide (i.e. launch) tracer light to the side-emitting optical fiber 20. The respective traced ends should therefore be understood as the respective ends of the cable 3 and optical fiber 20 opposite the launched ends. The traced end, particularly of the cable 3, is the end of the cable that needs to be identified by the tracing process. It should be understood that these ends are not fixed. For any given operation, either end of the cable 3 may constitute the launched end and the traced end.

The size of each scattering site 40 may also be based on the challenges associated with cable assemblies for data centers or similar network locations. The size of each scattering site 40 may include the arc sweep around the side-emitting optical fiber 20. The size of each scattering site 40 may also include the magnitude M (FIG. 3) along the length of the side-emitting optical fiber 20 (i.e., "magnitude M" refers to the length of each scattering site measured parallel to the lengthwise axis of the side-emitting optical fiber 20). In some embodiments, the magnitude M may be between about 10 microns and about 50 mm, or even between about 0.5 mm and about 4 mm (such as about 2 mm for one specific example).

Further, the scattering sites 40 may be characterized by their depth D (FIG. 5) from the exterior surface 36 to a point closest to the core 30. One skilled in the art will appreciate that light traveling through the side-emitting optical fiber 20 may be described as forming a bell shaped distribution pattern relative to the central lengthwise axis of the core 30. The edges of the distribution, the part traveling through the cladding 32, may be referred to as the evanescent tail of the propagating light. It is this tail that is clipped by the scattering sites 40 and sent traveling in all directions. Therefore, the deeper each scattering site 40 penetrates into the cladding 32, the greater portion of the light distribution that is available for scattering by the scattering site 40. Therefore, selecting the depth D of each scattering site 40 balances the desire to scatter out a sufficient amount of light to be visible in a well-lit room with the desire to maintain enough light within the side-emitting optical fiber 20 to provide sufficient light to each of the scattering sites 40 downstream.

In an extreme example, the scattering sites 40 may remove the cladding 32 completely down to the core 30. In one example, the scattering sites 40 do not completely remove the cladding 32 at the given location. Depths D may include between about 1% to about 100% of the thickness of the cladding 32. Yet again, the depth D of each scattering site 40 may be substantially consistent along the length of the cable 3. Alternatively, the depth D may vary as a function of the distance from an end of the cable 3 or side-emitting optical fiber 20. For example the depth D may increase with distance from the launched end. The depth D is generally defined as a maximum distance toward the core 30 or a maximum percentage of cladding removal for any given scattering site 40. The process used, and resulting surface profile of each scattering site 40, is likely to render a range of depths for any given scattering site 40. In some embodiments, the range of depths may be minimized and essentially random. In other embodiments, the range of depths may be provided with a general profile, like the concave areas represented in FIGS. 5 and 6.

The side-emitting optical fiber 20 may include at least one coating 50 applied to the exterior surface 36 and scattering sites 40 of the cladding 32. The coating 50 may be between about 10 and about 70 microns thick. The coating 50 may be provided as a layer of protection for the core 30 and the cladding 32. The coating 50 should be at least translucent, if not fully transparent, in locations corresponding with the scattering sites 40. The coating 50 may have light transmission windows or have generally uniform light transmission characteristics. The coating 50 may be made from acrylate. The refractive index of the coating 50 may be 1.56 relative to the refractive index of the optical cladding 32 of 1.35.

The side-emitting optical fiber 20 may also include an ink layer 60 applied to the coating 50. The ink layer 60 may be selectively applied to locations corresponding with the scattering sites 40. Alternatively, the ink layer 60 may be uniformly applied to the coating 50. The ink layer 60 may have further scattering elements, such as titanium oxide spheres, configured to diffuse the light being emitted from the side-emitting optical fiber 20. The ink layer 60 is configured to provide each tracer location 4 with an approximate Lambertian distribution pattern.

The side-emitting optical fiber 20 of the present disclosure has been described for use in facilitating traceability of a cable 3. In some embodiments, the side-emitting optical fiber 20 may have uses independent of the cable 3. For example, the side-emitting optical fiber 20 may not be used for tracing at all, but may itself provide decorative or functional illumination or indication.

Side-emitting optical fibers 20 according to this disclosure may be manufactured according to a process schematically illustrated in FIG. 7. A core 30, such as a glass core may be fed, pulled, or drawn, or otherwise passed at typical telecom speeds through a first liquid die block 70. There, a cladding 32 is deposited or otherwise applied to the core 30. In one example, process for adding the cladding 32 may be a pultrusion process. The cladded core 33 may pass through a curing station 73 where the cladding 32 is at least partially cured. In one example, the curing station 73 may emit UV light from lamps or LEDs to rapidly, optically cure the cladding 32.

Figure 8:
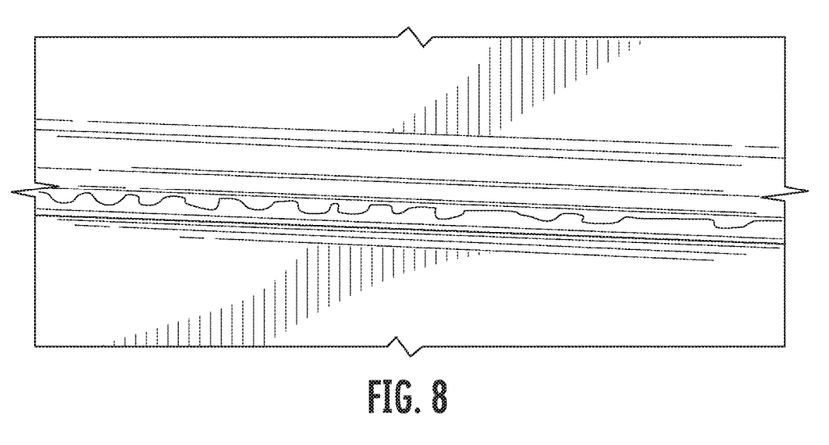
FIG. 8 shows example scattering sites of the side-emitting optical fiber as viewed under a microscope.

After the cladding 32 is at least partially cured, the scattering sites 40 may be created by ablating the exterior surface 36 with at least one high intensity light source, such as a laser 76 as the cladded core 33 is drawn past. Two or more light sources positioned around the core 30 may be provided to achieve the desired arc sweep for each scattering site 40. The high intensity light impacts the cladding 32 and forms the scattering sites 40 by vaporizing or burning off some of the cladding 32 while locally affecting other portions of the cladding 32 to produce the resulting locally roughened surface as shown in FIG. 8. The roughened surface may be described as having a series of defects or voids. It should be recognized that the scattering sites 40 will be at least as large as the wavelength of the laser 76. Using a less collimated beam emitted from slightly further from the cladded core 33 can produce scattering sites 40 that are wider radially. The laser 76 is also likely to cause a hot spot on the cladding 32 that spreads beyond the area directly in path with the light beam.

In one embodiment, each laser 76 is a $CO_2$ laser, running at a repetition rate of 0.25 Hz to 100000 Hz with pulse energies of approximately 10000 W/s to 20000 W/s and pulse duration of 0.1 µs to 10 seconds. As will be appreciated by one of ordinary skill in the art, other types of lasers, emitting other wavelengths of light, may be used. The repetition rate, pulse energy, and pulse duration may all be adjusted based on the draw rate of the cladded core 33 to achieve scattering sites 40 with the desired separation P, magnitude M, and depth D.

After the formation of the scattering sites 40 penetrating the exterior surface 36 of the cladding 32, the cladded core 33 may pass through a second liquid die block 80 where a similar pultrusion process may add a coating 50 over the ablated cladding. The coating 50 may be cured as it passing through a second curing station (not shown), or may be cured by other known means, such as temperature.

To provide a smoother, more Lambertian, light distribution pattern from the side-emitting optical fiber 20, a scattering ink layer 60 may be applied onto the coating 50 at a third liquid die block 84, or other processing unit, such as a spray applicator or printer.

In one embodiment, the side-emitting optical fiber 20 is manufactured on a single draw. As will be understood by those of skill in the art, the side-emitting optical fiber 20 can be produced in a continuous fashion on a single line, at a single location. Alternatively, it is possible that the side-emitting optical fibers 20 of the present description could also be produced by discrete steps at separate locations. For example, the core 30 may be wound up, transported between locations or manufacturing stations, and then run through the first liquid die block 70 for cladding. In another example, the scattering sites 40 may be created separate from the drawing of the cladded cores 33.

The side-emitting optical fibers 20 may continue on the single line directly to the manufacture of the cable 3. Alternatively, the side-emitting optical fiber 20 may be separately combined with the data transmission elements 7 and the jacket 10 in a different location or distinct time. In one embodiment, an extrusion or pultrusion process may be used to at least partially embed the side-emitting optical fiber 20 with the jacket 10 as the jacket 10 is being formed around the data transmission element 7. The side-emitting optical fiber 20 may be combined with at least one data transmission element 7 and a jacket 10 by a variety of processes known in the art, depending upon the particular type of cable 3 that is being manufactured.

Cable assemblies 1 may be made by cutting the cable 3 to a desired length and attaching the desired connectors 5 to each end according to processes known in the art, and dependent upon the type of cable assembly 1 being produced. For example, the connector 5 may be SC, LC, ST, FC, or MPO type connectors.

The side-emitting optical fibers 20, cables 3 that incorporate the side-emitting optical fibers 20, and cable assemblies 1 that incorporate the cables 3, each have several advantages that will be apparent to one of ordinary skill in the art. Particularly, use of a side-emitting optical fiber 20 within the cable 3 provides an improved ability for a network operator to quickly and efficiently trace a particular cable assembly 1 so that a traced end can be identified from a predetermined launched end of the cable assembly 1. The side-emitting optical fibers 20 of this disclosure can be configured to facilitate the ability to trace along the full length of the cable 3. This may be helpful to identify tangles or knots. This may also help when the particular equipment rack 110, in which the traced end is connected, is unknown. For example, equipment racks 110 often have front doors that are kept closed. Tracing along the length of the cable 3 may help identify which rack to search. If a tracer location 4 were only on the traced end the cable 3, it may be hidden behind the door.

While side-emitting optical fibers 20 according to this disclosure may provide tracer locations 4 along the length of a cable 3, they are usually not intended to provide continuous illumination along the length. As a result, the side-emitting optical fibers 20 are able to make more efficient use of a tracer source light. This means that tracer locations 4 can be provided along cables 3 of significant length, for example 30 m or more, while the tracer locations 4 may remain sufficiently bright to be readily visible in a well-lit room using a tracer source light of reasonable intensity.

A tracer light source may be integrated into the cable 3, or the connector 5, to illuminate the side-emitting optical fiber 20. In some embodiments, however, a separate tracer light source may be used to selectively emit light into the side-emitting optical fiber 20. By using a separate tracer light source, the cost of the cable 3 may be reduced compared to systems integrating a light source or using active light sources along the length to form the individual tracer locations 4.

In advantageous embodiments, the side-emitting optical fiber 20 can be made with a continuous manufacturing process where each step is performed on a single draw. Such a continuous process may provide a high rate of manufacture with minimum waste, transportation costs or labor costs. Use of laser ablation to form the scattering sites 40 provides a processing step that can be readily controlled in terms of pulse rate, pulse energy, and duration to finely tune the separation, arc sweep, and magnitude of the scattering sites 40 to achieve the best combination of traceability, brightness, and manufacturing efficiency.

Persons skilled in waveguide technology will appreciate additional variations and modifications of the devices and methods already described. Additionally, where a method claim below does not explicitly recite a step mentioned in the description above, it should not be assumed that the step is required by the claim. Furthermore, where a method claim below does not actually recite an order to be followed by its steps or an order is otherwise not required based on the claim language, it is not intended that any particular order be inferred.

The above examples are in no way intended to limit the scope of the present invention. It will be understood by those skilled in the art that while the present disclosure has been discussed above with reference to examples of embodiments, various additions, modifications and changes can be made thereto without departing from the spirit and scope of the invention as set forth in the claims.

What is claimed is:

1. A traceable cable having a length, comprising:
   at least one data transmission element;
   a jacket at least partially surrounding the at least one data transmission element; and
   a side-emitting optical fiber incorporated with and extending along at least a portion of the length of the traceable cable, wherein the side-emitting optical fiber is at least partially embedded in the jacket, the side-emitting optical fiber comprising:
   a core having a first index of refraction;
   a cladding having a second index of refraction less than the first index of refraction, the cladding substantially surrounding the core, the cladding having an exterior surface and spaced apart laser-ablated scattering sites penetrating the exterior surface along a length of the side-emitting optical fiber, wherein the laser-ablated scattering sites each comprise an optically rough surface portion of the cladding; and
   an acrylic coating on the exterior surface of the cladding and on the optically rough surface portion of the cladding.

2. The traceable cable of claim 1, wherein the core comprises glass or polymer having diameter between about 100 and about 250 microns, and further wherein the cladding comprises fluoro-acrylate.

3. The traceable cable of claim 1, wherein the laser-ablated scattering sites extend completely through the cladding.

4. The traceable cable of claim 1, wherein the laser-ablated scattering sites do not extend to the core.

5. The traceable cable of claim 1, wherein the laser-ablated scattering sites are configured to scatter light in all directions around a lengthwise axis of the side-emitting optical fiber.

6. The traceable cable of claim 1, wherein at least some of the laser-ablated scattering sites extend fully around a circumference of the cladding.

7. The traceable cable of claim 1, wherein at least some of the laser-ablated scattering sites extend only partially around a circumference of the cladding.

8. The traceable cable of claim 1, wherein the laser-ablated scattering sites are periodically spaced along the length of the side-emitting optical fiber between about 4 cm and about 1 m apart.

9. The traceable cable of claim 1, wherein the side-emitting optical fiber is a step-index optical fiber.

10. The traceable cable of claim 1, wherein a depth of the laser-ablated scattering sites varies as a function of the distance from an end of the side-emitting optical fiber.

11. The traceable cable of claim 1, wherein each laser-ablated scattering site has a magnitude between about 0.1 mm and about 50 mm along the length of the side-emitting optical fiber.

12. The traceable cable of claim 11, wherein the magnitude varies as a function of the distance from an end of the side-emitting optical fiber.

13. The traceable cable of claim 12, further comprising an ink layer applied to the acrylic coating for further diffusion of scattered light.

14. The traceable cable of claim 1, wherein the at least one data transmission element is an optical fiber.

15. The traceable cable of claim 1, wherein the jacket comprises a pigmented portion and an un-pigmented portion, the side-emitting optical fiber being at least partially embedded in the un-pigmented portion.

16. A traceable cable having a length, comprising:
a first connector;
a second connector;
at least one data transmission element extending between the first connector and the second connector;
a jacket at least partially surrounding the at least one data transmission element; and
a side-emitting optical fiber extending along at least a portion of the length of the traceable cable, wherein the side-emitting optical fiber is at least partially embedded in the jacket, the side-emitting optical fiber comprising:
a core having a first index of refraction;
a cladding having a second index of refraction less than the first index of refraction, the cladding substantially surrounding the core, the cladding having an exterior surface and spaced apart laser-ablated scattering sites penetrating the exterior surface along a length of the side-emitting optical fiber, wherein the laser-ablated scattering sites each comprise an optically rough surface portion of the cladding; and
an acrylic coating over the exterior surface of the cladding and on the optically rough surface portion of the cladding.

17. A traceable cable having a length, comprising:
at least one data transmission element extending between a first connector and a second connector;
a jacket at least partially surrounding the at least one data transmission element, wherein the jacket comprises a first pigmented portion and a second pigmented portion, wherein the first pigmented portion comprises more pigment than the second pigmented portion; and
a side-emitting optical fiber extending along at least a portion of the length of the traceable cable, wherein the side-emitting optical fiber is at least partially embedded in the second pigmented portion of the jacket, the side-emitting optical fiber comprising:
a core having a first index of refraction;
a cladding having a second index of refraction less than the first index of refraction, the cladding substantially surrounding the core, the cladding having an exterior surface and spaced apart laser-ablated scattering sites penetrating the exterior surface along a length of the side-emitting optical fiber, wherein the laser-ablated scattering sites each comprise an optically rough surface portion of the cladding; and
an acrylic coating over the exterior surface of the cladding and on the optically rough surface portion of the cladding.

18. The traceable cable of claim 17, wherein the second pigmented portion is at least partially transparent.

19. The traceable cable of claim 17, wherein the first pigmented portion comprises a pigment selected to identify the traceable cable.

20. The traceable cable of claim 17, wherein a depth of the laser-ablated scattering sites varies as a function of the distance from an end of the side-emitting optical fiber.

21. A traceable cable having a length, comprising:
at least one data transmission element;
a jacket at least partially surrounding the at least one data transmission element; and
a side-emitting optical fiber incorporated with and extending along at least a portion of the length of the traceable cable, wherein the side-emitting optical fiber is at least partially embedded in the jacket, the side-emitting optical fiber comprising:
a core having a first index of refraction;
a cladding having a second index of refraction less than the first index of refraction, the cladding substantially surrounding the core, the cladding having an exterior surface and spaced apart laser-ablated scattering sites penetrating the exterior surface along a length of the side-emitting optical fiber, wherein the laser-ablated scattering sites each comprise an optically rough surface portion of the cladding, wherein at least some of the laser-ablated scattering sites extend at least partially around a circumference of the side-emitting optical fiber; and
an acrylic coating on the exterior surface of the cladding and on the optically rough surface portion of the cladding.

22. The traceable cable of claim 21, wherein at least some of the laser-ablated scattering sites extend fully around a circumference of the cladding.

23. The traceable cable of claim 21, wherein at least some of the laser-ablated scattering sites extend only partially around a circumference of the cladding.

24. A traceable cable having a length, comprising:
at least one data transmission element;
a jacket at least partially surrounding the at least one data transmission element; and
a side-emitting optical fiber incorporated with and extending along at least a portion of the length of the traceable cable, wherein the side-emitting optical fiber is at least partially embedded in the jacket, the side-emitting optical fiber comprising:
a core having a first index of refraction;
a cladding having a second index of refraction less than the first index of refraction, the cladding substantially surrounding the core, the cladding having an exterior surface and spaced apart laser-ablated scattering sites penetrating the exterior surface along a length of the side-emitting optical fiber, wherein the laser-ablated scattering sites each comprise an optically rough surface portion of the cladding, wherein the laser-ablated scattering sites are periodically spaced along the length at least 1 cm apart; and
an acrylic coating on the exterior surface of the cladding and on the optically rough surface portion of the cladding.

25. A traceable cable having a length, comprising:
at least one data transmission element;
a jacket at least partially surrounding the at least one data transmission element; and
a side-emitting optical fiber incorporated with and extending along at least a portion of the length of the traceable cable, wherein the side-emitting optical fiber is at least partially embedded in the jacket, the side-emitting optical fiber comprising:
a core having a first index of refraction;
a cladding having a second index of refraction less than the first index of refraction, the cladding substantially surrounding the core and having a thickness between about 4% and about 40% of a diameter of the core, the cladding having an exterior surface and spaced apart laser-ablated scattering sites penetrating the exterior surface along a length of the side-emitting optical fiber, wherein the laser-ablated scattering sites each comprise an optically rough surface portion of the cladding; and an acrylic coating on the exterior surface of the cladding and on the optically rough surface portion of the cladding.

26. A traceable cable having a length, comprising:

at least one data transmission element;

a jacket at least partially surrounding the at least one data transmission element; and a side-emitting optical fiber incorporated with and extending along at least a portion of the length of the traceable cable, wherein the side-emitting optical fiber is at least partially embedded in the jacket, the side-emitting optical fiber comprising:

a core having a first index of refraction;

a cladding having a second index of refraction less than the first index of refraction, the cladding substantially surrounding the core, the cladding having an exterior surface and spaced apart laser-ablated scattering sites penetrating the exterior surface along a length of the side emitting optical fiber, wherein the laser-ablated scattering sites each comprise an optically rough surface portion of the cladding; and an acrylic coating on the exterior surface of the cladding and on the optically rough surface portion of the cladding, the acrylic coating having a thickness between about 10 microns and about 70 microns.

\* \* \* \* \*